UNITED STATES PATENT OFFICE.

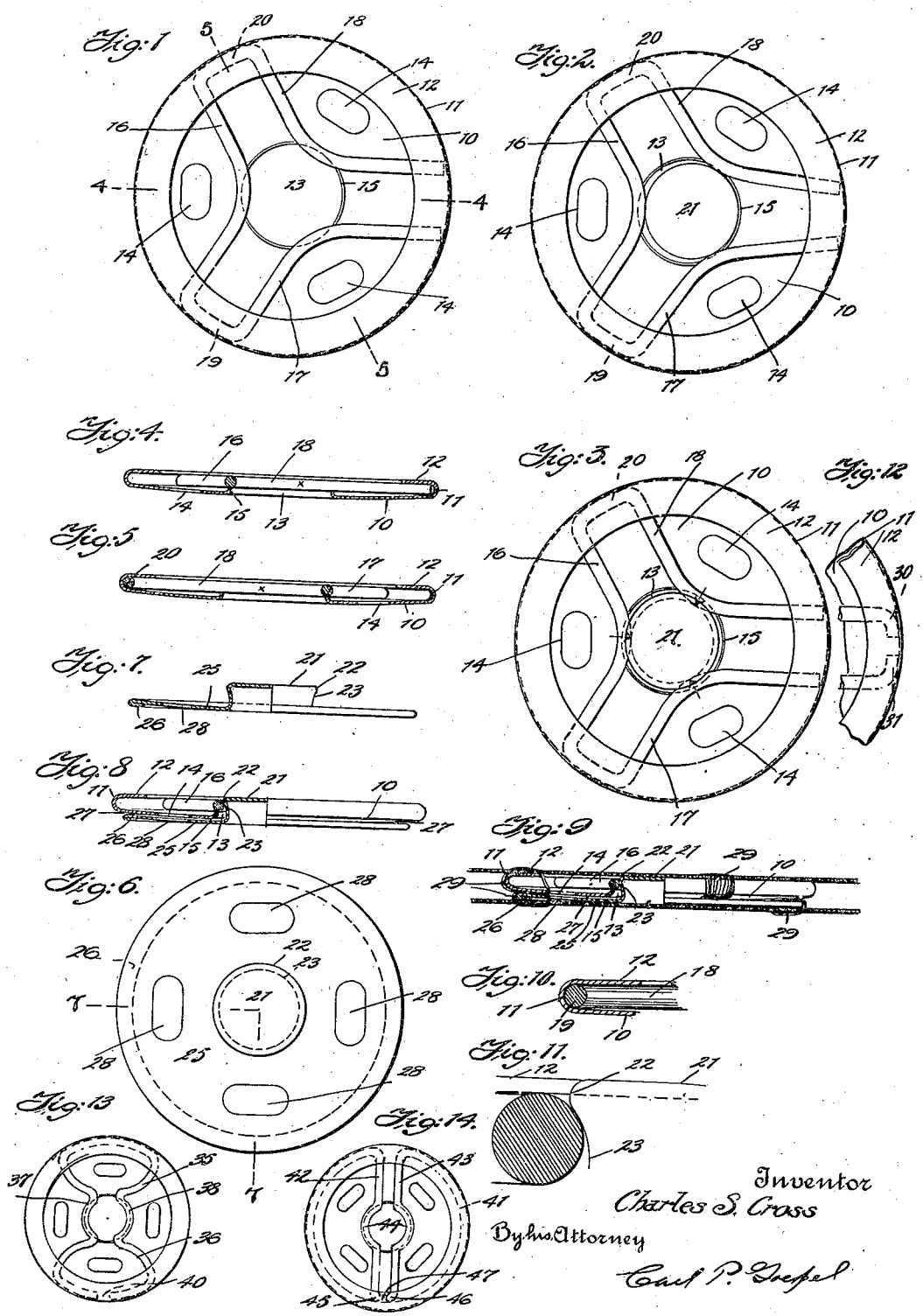

CHARLES S. CROSS, OF BROOKLYN, NEW YORK, ASSIGNOR TO CROSS METAL PRODUCTS CORPORATION, A CORPORATION OF NEW YORK.

SNAP-FASTENER.

1,262,646.  Specification of Letters Patent.  Patented Apr. 16, 1918.

Application filed February 26, 1917. Serial No. 150,949.

*To all whom it may concern:*

Be it known that I, CHARLES S. CROSS, a citizen of the United States, and a resident of the borough of Brooklyn, in the county of Kings, city and State of New York, have invented certain new and useful Improvements in Snap-Fasteners, of which the following is a specification.

The present invention relates to improvements in snap fasteners and has for its object to provide as one embodiment of the invention an improved fastener of this character, which will be of simple and inexpensive construction and which will prove efficient in operation, enabling the fastener to be closed in an easy manner, and providing a strong and reliable connection between the two members thereof, and which at the same time will permit of the comparative easy detachment of the members.

It is proposed to provide in such a fastener, a novel form of spring, supported in a novel form of shell of the fastener, coöperating to provide a reliable and positive spring action, and to retain the spring against an accidental displacement or removal. More particularly, the object is to provide a fastener of relatively thin proportions so that the same may be used in an inconspicuous manner with thin materials, such as silk, pongee, etc., the upper and lower surfaces of the two members when fastened, being entirely flat, there being no protruding portions which tend to wear out the material.

With these and other objects in view, embodiments of my invention are shown in the accompanying drawings, and these embodiments will be hereinafter more fully described with reference thereto, and the invention will be finally pointed out in the claims.

In the accompanying drawings;

Figure 1 is a plan view of the socket or female member of an embodiment of my invention;

Fig. 2 is a similar view showing the head of the male member being inserted;

Fig. 3 shows the male member inserted;

Fig. 4 is a sectional view along the line 4—4 of Fig. 1;

Fig. 5 is a sectional view along the line 5—5 of Fig. 1;

Fig. 6 is a plan view of the male member;

Fig. 7 is a section-elevation view thereof along the line 7—7 of Fig. 6;

Fig. 8 shows the members attached and partly in elevation, and partly in section;

Fig. 9 is a similar view showing the same attached to the material;

Figs. 10 and 11 are details showing the connection of the spring with the shell, and with the stud respectively;

Fig. 12 is a plan view with parts broken away, of a slightly modified form of construction, and Figs. 13 and 14 show two further modified forms.

Similar reference characters indicate corresponding parts throughout the several figures of the drawings.

Referring to the drawings, one embodiment of my invention comprises a plate 10, having a rim 11 overturned as at 12, and provided centrally with a circular opening 13, about which are radially disposed smaller openings 14 for permitting sewing of the fastener to the garment. The plate is slightly dished, and at the opening 13 is turned in as at 15 to form a circular flange.

A spring holding member formed from a single piece of spring wire is held upon the plate by means of the overturned portion 12 of the rim, the central portion resting on and projecting within the inturned portion 15. This member comprises a plurality and preferably three inwardly extending and radially disposed angular or V-shaped portions 16, 17 and 18, the intermediate portion 17 being connected to the other portions 16 and 18 by circumferential connecting portions 19 and 20, the free ends of the said portions 16 and 18 being unconnected. The circumferential portions and the ends of the wire, lie entirely beneath the overturned rim portion 12. The angular corners of the portions 16, 17 and 18 project within the circumference of the opening 13, thereby providing a three point spring contact for the head 21 of the male member, as clearly indicated by the arrows in Fig. 3, and resting upon the inturned portion or circular flange 15. The corners are preferably rounded, as shown, but may, if desired, be more pointed. In Figs. 4 and 5, I have indicated by cross marks the contact points of the spring members. Fig. 2 indicates the tensioned position of the spring, which is assumed when the points of the same are engaged by the widest part of the head 21. The portion 16, the ends of which are firmly anchored as shown in Fig. 10, forms a solid support from which the other portions 17 and 18 are forced by the enlarged part of the stud. When the neck of the head is reached, the spring again assumes substantially its normal position, but hugs the shank, retaining the parts together to prevent looseness of the connections. The top of the head, it will be noted, is substantially flat, and at the edge is rounded as at 22 forming a continuously rounded surface with the under rounded portion 23. Thus the head may be inserted and removed with comparative ease and with the least amount of friction. The support of the spring at the center on the circular flange at one side, and at the outer and upper portions by the turned over portion 12 of the rim, retains the spring substantially in the shell, preventing the same from turning, and causes the spring when tensioned by insertion of the male member, to move substantially laterally. The support of the spring from beneath by the inturned flange, results in a cam action upon withdrawal of the head, causing the spring to move substantially laterally so that there is quite a tight connection between the two members, the flange also taking up the increased strain upon the shell during withdrawal of the head. During insertion, the spring has more freedom of movement, so that the head may be inserted with comparative ease, although the overturned rim of the present embodiment causes it to move substantially laterally. The spring is clamped by the overturned shell edge pressing the spring against the circular flange. In this way the shape of the spring is retained, even after very extensive use, and the same will function perfectly.

The dished shape of the shell, together with the turned in portion 15 in addition to greatly strengthening the same, eliminates any sharp edges, and forms a guide for the head when entering the opening of the spring. The increased thickness at the center of the shell permits of the head being inserted without projecting from the inner side of the shell, at the same time giving sufficient purchase room for the spring. The base portion 25 of the male member is dished substantially corresponding to the contour of the shell, and is provided with a strengthening rim 26. There is a slight space, as at 27 between the two members, as clearly indicated in Fig. 8. Openings 28 are provided for sewing the member to the garment. As will be seen from this figure, the upper and lower sides are substantially flat and parallel, and the entire fastener relatively thin. The extreme height of the male member is substantially equal to the height of the female member plus the thickness of the metal from which the male member is formed. When the fastener is secured to the material, the attaching thread 29 (Fig. 9) closes the space 27 at several points, thereby rigidly holding the members together, and at the same time this space between the attachment points, the dished shape of the members, the rounded corners and the slightly smaller diameter of the male member, provide an opening to permit the finger nail to be inserted between the members to readily detach the same.

In the form of construction shown in Fig. 12, the ends of the portions 16, 17 and 18 are turned in as at 30 and 31.

In Fig. 13 I have shown another modified form of construction, in which the spring is of a different form, comprising a single piece of spring wire bent into two loop shaped portions 35 and 36, which engage the rim of the shell, and an intermediate portion for engaging the head of the stud member, this portion which consists of two diametrically opposed circumferential portions 37 and 38 which project slightly within the opening of this shell. The ends of the spring are slightly spaced apart as at 40. The shell is similar to that employed in the other construction.

In the further modified form shown in Fig. 14, I form the spring into a ring 41, which is disposed beneath the rim of the shell, the ends of the wire being bent transversely across the shell as at 42 and 43, and shaped intermediately to conform to the opening of the shell, this portion projecting within the opening to form a head engaging portion 44 for the stud member. The wire ends are overturned as at 45 and 46, and slightly spaced apart as at 47. The shell is the same as employed in the other forms.

I have illustrated and described preferred and satisfactory embodiments of my invention, but it is obvious that changes may be made therein, within the spirit and scope thereof, as defined in the appended claims.

I claim:

1. In a snap fastener of the character described, a female member, comprising a convex supporting shell having a central opening, and a rim overturned back on the shell to be substantially parallel therewith, and a spring member held to said supporting member by said overturned rim and having a thickness equal to the distance between the parallel portion of the overturned rim and the corresponding part of the shell, said shell being inturned forming a flange at said central opening so as to have a contact with said spring member to form a central support for said spring at the side opposite from said overturned rim, securing the spring and preventing its changing position in a direction perpendicular to the shell, but allowing it to relax and contract laterally.

2. In a snap fastener of the character described, the combination with a female member, comprising a dished supporting shell having a central opening, a spring member in said supporting shell, portions of said spring member projecting within the circumference of said central opening of the supporting shell, and a rim on the dished supporting shell overturned to embrace the spring member and arranged substantially parallel with the extreme portion of the bottom of the shell, the distance between this portion of the bottom of the shell and the overturned rim being equal to the thickness of the spring, a male member comprising a dished base of substantially the same configuration as the dished supporting shell, and a head having a substantially flat upper surface and a reduced neck portion, said head adapted to be inserted through said opening into engagement with the portions of said spring, said upper surface of said head when inserted being substantially flush with the inner side of said female member, the extreme height of said male member being substantially equal to the height of said female member plus the thickness of the metal from which said male member is formed.

3. In a snap fastener of the character described, the combination with a female member, comprising a dished supporting shell having a central opening and a rim overturned back on the shell to be substantially parallel therewith, and a spring member held to said supporting member by said overturned rim and of a thickness equal to the distance between the supporting shell and the overturned rim, said shell being inturned forming a flange at said central opening so as to have contact with said spring and to form a central support for said spring at the opposite side from said overturned rim, securing the spring and preventing its changing position in a direction perpendicular to the shell but allowing it to relax laterally, of a male member comprising a dished base of substantially the same configuration as the dished supporting shell, and having a head with a substantially flat upper surface and a reduced neck portion, said head adapted to be inserted through said opening into engagement with the portions of said spring, said upper surface of said head when inserted, being substantially flush with the inner side of said female member, the extreme height of said male member being substantially equal to the height of said female member plus the thickness of the metal from which said male member is formed.

4. In a snap fastener of the character described, the combination with a female member, comprising a shell having a central opening, a spring member held on said shell, portions of said spring member projecting within the circumference of said central opening of said shell, of a male member comprising a base and a head having a substantially flat upper surface and a reduced neck portion, said head adapted to be inserted through said opening into engagement with the projecting portions of said spring, said upper surface of said head when inserted being substantially flush with the inner side of said female member, the extreme height of said male member being substantially equal to the height of said female member plus the thickness of the metal from which said male member is formed.

5. In a snap fastener of the character described, the combination of a convex supporting shell, having a central opening, a rim overturned back on the shell, and an inturned flange at said central opening with a spring held by said overturned rim and by said inturned flange, said spring extending over the opening.

6. In a snap fastener, the combination of a female member comprising a convex supporting shell, having a central opening, a rim overturned back on the shell, an overturned flange at said central opening with a spring held by said overturned rim and supported from beneath by said inturned flange, said spring extending over the opening, with a male member comprising a base, and a head having a reduced neck, and adapted to be engaged with portions of said spring, extending over said opening of said female member, said flange adapted to prevent movement of said spring in a direction perpendicular to the shell upon withdrawal of said head, but allowing it to relax and contract laterally.

In testimony, that I claim the foregoing as my invention, I have signed my name in presence of two subscribing witnesses.

CHARLES S. CROSS.

Witnesses:
  E. LEWIS MATTERN,
  AGNES Y. COUGAN.

Copies of this patent may be obtained for five cents each, by addressing the "Commissioner of Patents, Washington, D. C."